United States Patent
Wu et al.

(10) Patent No.: US 11,591,975 B2
(45) Date of Patent: Feb. 28, 2023

(54) THROTTLE VALVE AND VEHICLE

(71) Applicant: Vitesco Technologies GmbH, Hannover (DE)

(72) Inventors: Jin Wu, Schwalbach a Ts. (DE); Zhengmao Wei, Schwalbach a Ts. (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 0 days.

(21) Appl. No.: 17/276,514

(22) PCT Filed: Sep. 12, 2019

(86) PCT No.: PCT/EP2019/074427
§ 371 (c)(1),
(2) Date: Mar. 16, 2021

(87) PCT Pub. No.: WO2020/058097
PCT Pub. Date: Mar. 26, 2020

(65) Prior Publication Data
US 2022/0034264 A1 Feb. 3, 2022

(30) Foreign Application Priority Data
Sep. 17, 2018 (CN) .......................... 201821526642.5

(51) Int. Cl.
*F02D 9/10* (2006.01)
*F16K 27/02* (2006.01)
*F16K 31/04* (2006.01)

(52) U.S. Cl.
CPC .......... *F02D 9/1035* (2013.01); *F02D 9/107* (2013.01); *F02D 9/108* (2013.01); *F16K 27/0218* (2013.01); *F16K 31/042* (2013.01)

(58) Field of Classification Search
CPC ........ F02D 9/1035; F02D 9/107; F02D 9/108; F02D 2400/18; F02D 9/1085;
(Continued)

(56) References Cited

U.S. PATENT DOCUMENTS 5,575,256 A * 11/1996 Peters ....................... F02D 9/10
123/337
5,615,861 A * 4/1997 Pollmann ............ F16K 27/0218
123/403

(Continued)

FOREIGN PATENT DOCUMENTS

DE 19854594 5/2000
EP 1126146 8/2001
(Continued)

OTHER PUBLICATIONS

International Search Report issued in corresponding PCT Application PCT/EP2019/074427.
(Continued)

*Primary Examiner* — Phutthiwat Wongwian
*Assistant Examiner* — Susan E Scharpf
(74) *Attorney, Agent, or Firm* — Cozen O'Connor

(57) ABSTRACT

A throttle valve includes a housing, an electric motor and an insert. The electric motor is accommodated in the housing and drives opening and closing of an air flow passage of the throttle valve. The insert is partially enclosed in the housing and includes an electrically conductive insert body at least partially accessibly exposed from the housing, and an electrically conductive electric motor connector. One end of the motor connector is electrically connected to the insert body, and the other end thereof is electrically connected to the electrically conductive housing of the electric motor.

6 Claims, 9 Drawing Sheets

(58) Field of Classification Search
CPC .... F02D 11/10; F16K 27/0218; F16K 31/042; F02M 35/10249
See application file for complete search history.

(56) References Cited

U.S. PATENT DOCUMENTS

| | | | | |
|---|---|---|---|---|
| 6,352,241 B1* | 3/2002 | Hannewald | ............. | F02D 9/104 251/305 |
| 6,505,643 B2* | 1/2003 | Scholten | ............... | F02D 9/1035 137/554 |
| 6,557,523 B1* | 5/2003 | Bos | ......................... | F02D 11/10 123/399 |
| 7,469,677 B2* | 12/2008 | Hannewald | ........... | F02D 9/1035 251/308 |
| 7,770,557 B2* | 8/2010 | Ikeda | ....................... | F02D 9/106 251/305 |
| 8,453,621 B2* | 6/2013 | Damasceno | ............ | F02D 9/107 264/297.8 |
| 10,859,005 B2* | 12/2020 | Kim | ......................... | F02D 9/02 |
| 2001/0030518 A1* | 10/2001 | Reimann | ................. | F02D 9/104 123/337 |
| 2002/0056478 A1* | 5/2002 | Scholten | ............... | F02D 9/1035 137/554 |
| 2003/0024576 A1* | 2/2003 | Schaefer | ............... | F02D 9/1065 137/554 |
| 2004/0187920 A1* | 9/2004 | Schmidt | .................. | F16K 1/222 251/305 |
| 2005/0022787 A1* | 2/2005 | Arai | ....................... | F02D 9/1055 123/399 |
| 2008/0011269 A1* | 1/2008 | Tanimura | .............. | F02D 41/107 123/337 |
| 2019/0195145 A1* | 6/2019 | Kim | ....................... | F02D 9/107 |

FOREIGN PATENT DOCUMENTS

| | | |
|---|---|---|
| JP | 2008008194 | 1/2008 |
| WO | WO 9502493 | 1/1995 |
| WO | WO 2017064236 | 4/2017 |

OTHER PUBLICATIONS

Written Opinion issued in corresponding PCT Application PCT/EP2019/074427.

* cited by examiner

THROTTLE VALVE AND VEHICLE

CROSS REFERENCE TO RELATED APPLICATIONS

This is a U.S. national stage of International application No. PCT/EP2019/074427, filed on Sep. 12, 2019, which claims priority to Chinese Application No. 201821526642.5, filed Sep. 17, 2018, the content of each of which is incorporated herein by reference.

BACKGROUND OF THE INVENTION

1. Field of the Invention

The present device relates to a vehicle and components thereof, and in particular to a throttle valve for use in a vehicle power device and a vehicle comprising the throttle valve.

2. Description of the Prior Art

A throttle valve is generally provided in an engine of a vehicle, is disposed upstream of an intake manifold of the engine and connected to an intake duct, and is used for controlling the flow of air supplied to the intake manifold so as to control the flow of air entering an engine block.

After the throttle valve is produced, an electrostatic discharge test for the throttle valve is required. For example, the rotation of the electric motor in the throttle valve may generate electrostatic discharge. Therefore, it is usually necessary to determine the influence of the electrostatic discharge from the throttle valve on an electronic device of a client, for example, the influence on an electronic control unit (ECU), that is, determining whether the electronic device is damaged due to the electrostatic discharge from the throttle valve, for example breakdown and burn-out. A common method comprises simulating an electrostatic generation process by an electrostatic discharge gun and determining whether the electrostatic condition has an influence on the performance of the electronic device. Since the static electricity generated by the electric motor accounts for a large proportion of the electrostatic discharge from the throttle valve, it is necessary to test the influence of electrostatic discharge from the throttle valve, including the electrostatic discharge from the electric motor, on the electronic device. For a throttle valve with a metal housing, the electrostatic discharge gun shoots the metal housing, and the static electricity generated by the electrostatic discharge gun reaches the electronic device for a simulation test via a path formed by the metal housing, a metal housing of the electric motor, a wire, an adapter of the throttle valve to the electronic device of the client, and the electronic device so as to determine the influence of the electrostatic discharge on the electronic device. However, in order to reduce the weight of the throttle valve, a throttle valve housing of a plastic material is now often used. For the throttle valve housing of a plastic material, because the metal housing of the electric motor is enclosed in the plastic housing of the throttle valve and is not exposed, the electrostatic discharge gun cannot access the metal housing of the electric motor, and the electrostatic discharge cannot be transferred to the metal housing of the electric motor via the plastic housing as well, and thus the influence of the electrostatic discharge from the electric motor on the electronic device cannot be tested.

Further, for a brush motor, a filter capacitor is usually provided between a positive/negative electrode of the electric motor and the metal housing of the electric motor to remove the electromagnetic interference in the electric motor. However, if the electric motor is arranged in the non-conductive plastic housing, the metal housing of the electric motor cannot be grounded, so that the filter capacitor connected to the metal housing cannot be grounded, and in turn it is impossible to achieve the effect of removing the electromagnetic interference by the filter capacitor.

SUMMARY OF THE INVENTION

Therefore, an object of the present device is to solve at least one aspect of the above-mentioned problems and defects in the prior art and other technical problems.

According to one aspect of the present invention, a throttle valve for a vehicle and a vehicle are provided, which includes the throttle valve, which easily tests, even for a throttle valve having a plastic throttle valve housing, the influence of the static electricity generated by an electric motor of the throttle valve on an electronic device of a client, and allows for the grounding of the filter capacitor connected to the metal housing of the electric motor so as to further remove the electromagnetic interference generated in the electric motor.

The above object of the present device may be achieved by the throttle valve for a vehicle having the following technical features. The throttle valve comprises a housing, an electric motor and an insert, wherein the electric motor is accommodated in the housing and is used for driving the opening and closing of an air flow passage of the throttle valve; the insert is partially enclosed in the housing and comprises an electrically conductive insert body and an electrically conductive electric motor connector, the insert body being at least partially accessibly exposed from the housing; and the electric motor connector is enclosed in the housing, and one end of the electric motor connector is electrically connected to the insert body, and the other end thereof is electrically connected to the electrically conductive housing of the electric motor. In this technical solution, since the electrically conductive insert body is at least partially accessibly exposed from the housing, the electrostatic discharge gun directly shoots the portion, accessibly exposed from the housing, of the electrically conductive insert body, and the static electricity reaches the electronic device via a path formed by the insert body, the electric motor connector, the electrically conductive housing of the electric motor, a wire, an adapter of the throttle valve to the electronic device of the client, and the electronic device, thus implementing testing for the performance of the electronic device for the resistance to the electrostatic discharge from the throttle valve.

Advantageously, the insert body comprises an electrically conductive annular body and at least one electrically conductive connecting hole insert, and an inner surface of the annular body and at least a portion of the axial end surfaces of the annular body are exposed from the housing. The at least one electrically conductive connecting hole insert is adapted to cooperate with a housing connector to secure the housing to the vehicle, and both axial end faces of each of the connecting hole inserts are exposed from the housing. With this structure, the electrostatic discharge gun can either shoot the portion, exposed from the housing, of the axial end faces of the annular body or shoot the axial end faces of the connecting hole insert so as to implement an electrostatic test. Also, since the connecting hole insert is enclosed in the material of the housing, the housing connector such as a bolt is directly inserted through the connecting hole insert so as to connect the throttle valve housing and thus the throttle valve to the engine block. Compared to a conventional solution in which a plurality of connecting hole inserts are respectively inserted into connecting holes that have been formed in an injection-molded housing, the step of fitting the connecting hole insert into the connecting hole can be omitted owing to this structure.

Advantageously, the electric motor connector is connected to the annular body. Thus, in the antistatic performance test, the electrostatic discharge gun only needs to shoot the portion, exposed from the material of the housing, of the annular body.

Advantageously, the electric motor connector is connected to the connecting hole insert. Thus, in the antistatic performance test, the electrostatic discharge gun only needs to shoot the portion, exposed from the material of the housing, of the connecting hole insert.

Advantageously, the housing connector is an electrically conductive connector. In this solution, after the throttle valve is mounted to the vehicle, since the electrically conductive connector, such as a metal bolt, inserted in the connecting hole insert is electrically connected to an engine housing, the electrically conductive housing of the electric motor is then electrically connected to the engine housing via the electrically conductive electric motor connector, the connecting hole insert and the electrically conductive housing connector so as to realize the grounding of the electrically conductive housing of the electric motor, thereby achieving the effect of removing the electromagnetic interference by the filter capacitor.

Advantageously, the electric motor connector is integrally formed with the annular body and the at least one connecting hole insert. With this structure, the manufacturing of the insert is simplified, and the manufacturing costs are reduced. Moreover, it is made possible to easily implement the antistatic performance test whether the electrostatic discharge gun shoots the annular body or the connecting hole insert.

Advantageously, the electric motor connector comprises an annular part, and at least a portion of the annular part extends into an electric motor accommodating chamber formed in the housing to come into contact with the electrically conductive housing of the electric motor. After the injection molding of the housing of the electric motor with the insert enclosed therein, at least a portion of the annular part of the electric motor connector is exposed from the electric motor accommodating chamber such that the exposed portion can come into contact with the electrically conductive housing of the electric motor to implement electrical connection.

Advantageously, a central hole of the annular part is adapted to receive the material of the housing during the injection molding of the housing so as to position the electric motor connector in the housing. The structure realizes the positioning of the electric motor connector and improves the bonding strength between the insert and the material of the housing.

Advantageously, a recess is formed in at least one of the axial end faces of the annular body, and the recess is adapted to receive the material of the housing during the injection molding of the housing to bond the insert in the housing. The material for forming the housing during the injection molding enters the recess such that the bonding between the housing and the insert is stronger.

According to another aspect of the present device, a vehicle is provided, comprising the throttle valve as described above.

In the throttle valve and the vehicle according to an aspect of the present device, since one end of the electrically conductive electric motor connector is electrically connected to the portion, at least partially accessibly exposed from the housing, of the insert body and the other end thereof is electrically connected to the electrically conductive housing of the electric motor, the electrostatic discharge gun only needs to shoot the portion, exposed from the housing, of the insert body to test the influence of the electrostatic discharge from the electric motor on the electronic device of the client, solving the problem of being difficult to test the influence of the electrostatic discharge from an electric motor on an electronic device in the case of a throttle valve having a plastic housing. Also, it is possible to realize the grounding of the filter capacitor of the electric motor after the throttle valve is mounted to the vehicle, and the electromagnetic interference in the electric motor can be removed.

BRIEF DESCRIPTION OF THE DRAWINGS

The features and advantages of the embodiments of the present device will become apparent with reference to the following detailed description and the accompanying drawings, in the drawings.

DETAILED DESCRIPTION OF THE PRESENTLY PREFERRED EMBODIMENTS

The technical solution of the present device is further specifically described by way of embodiments and in conjunction with the accompanying drawings. The following description of the implementations of the present device with reference to the accompanying drawings is intended to explain the general concept of the present device, and should not be construed as limiting the present device.

In addition, in the following detailed description, for the purpose of explanation, many specific details are set forth in order to provide a thorough understanding of the embodiments. However, obviously, one or more embodiments may also be practiced without these specific details. In other cases, well-known structures and devices are not embodied by illustration to simplify the drawings.

Figure 1:
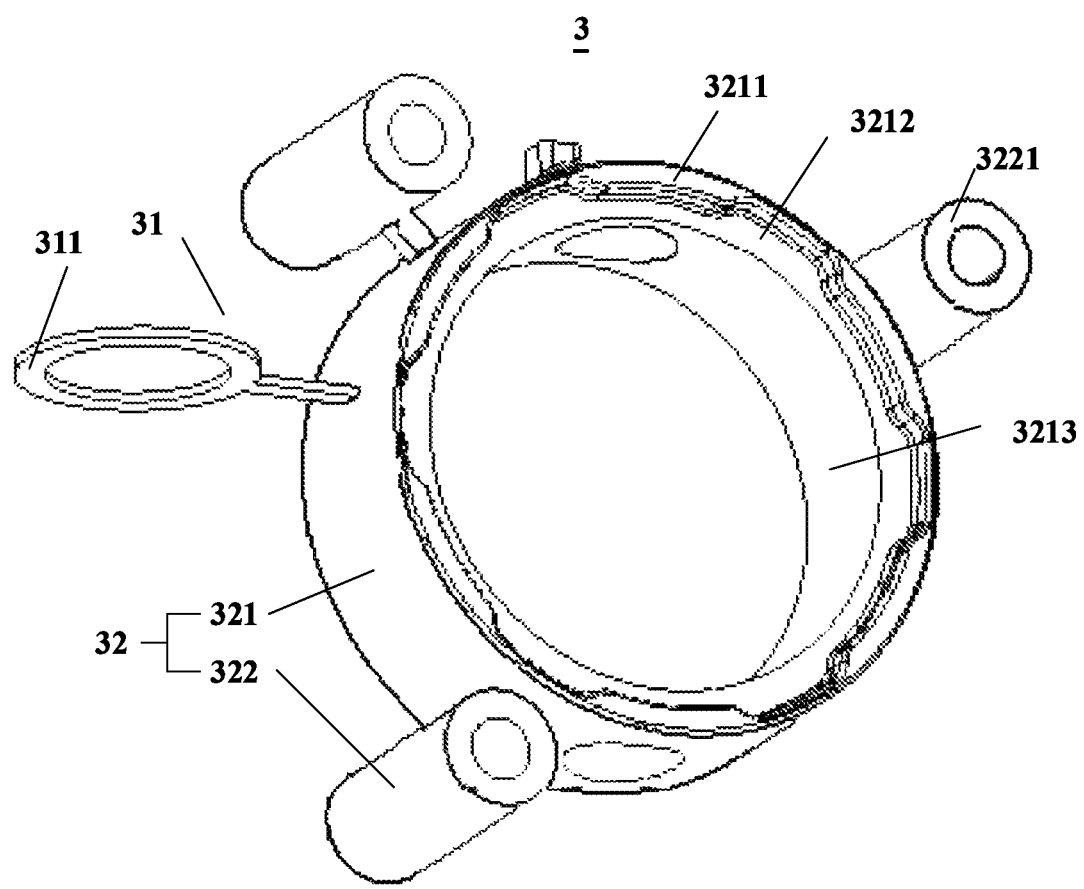
FIG. 1 shows a schematic perspective diagram of an insert according to one exemplary embodiment of the present device.
Figure 2:
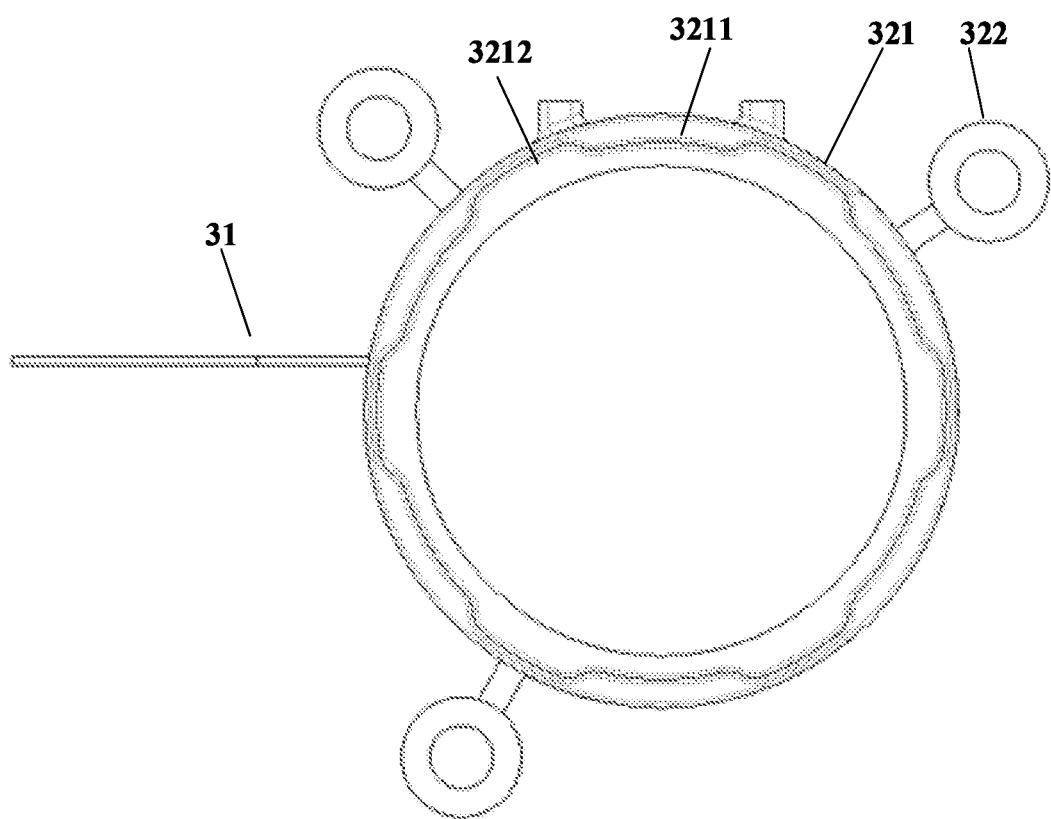
FIG. 2 shows a front schematic diagram of the insert as shown in FIG. 1.
Figure 3:
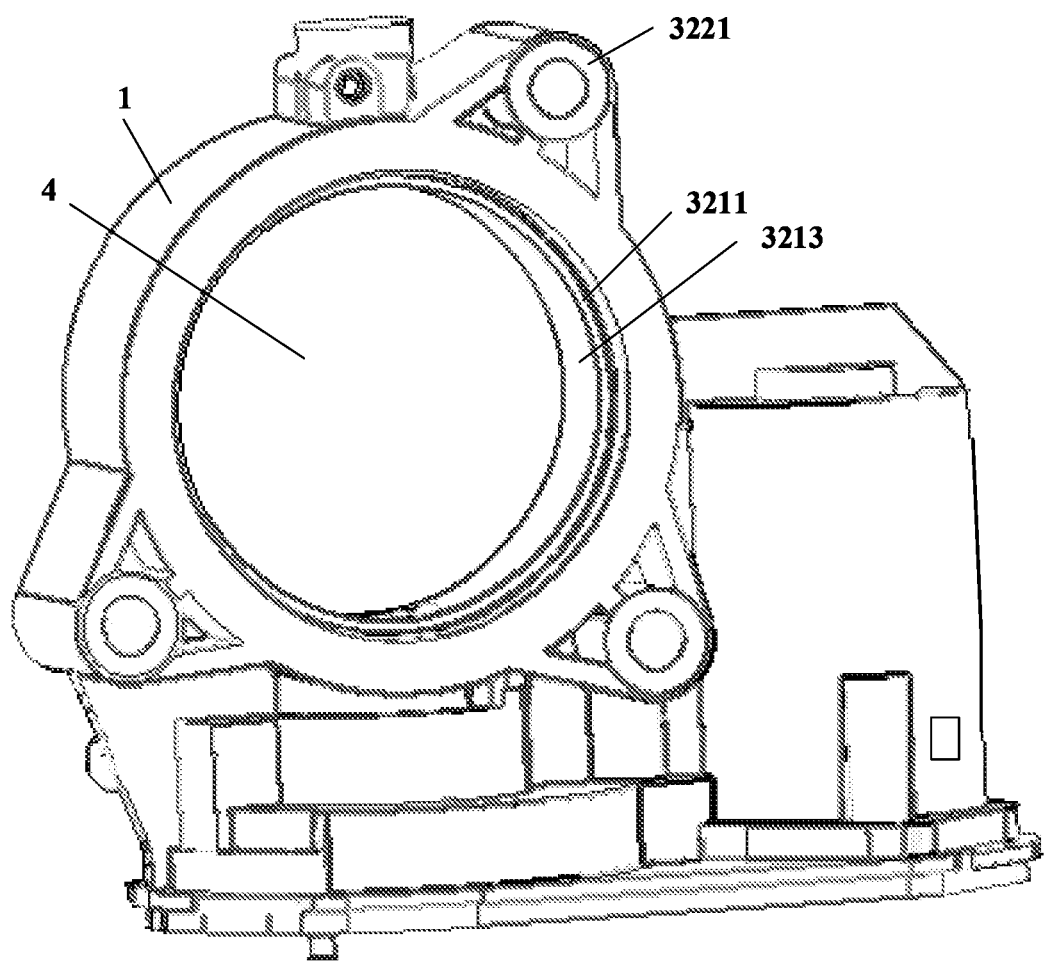
FIG. 3 shows a schematic perspective diagram of a throttle valve housing assembly according to one exemplary embodiment of the present device, with the insert over-molded in the throttle valve housing.
Figure 4:
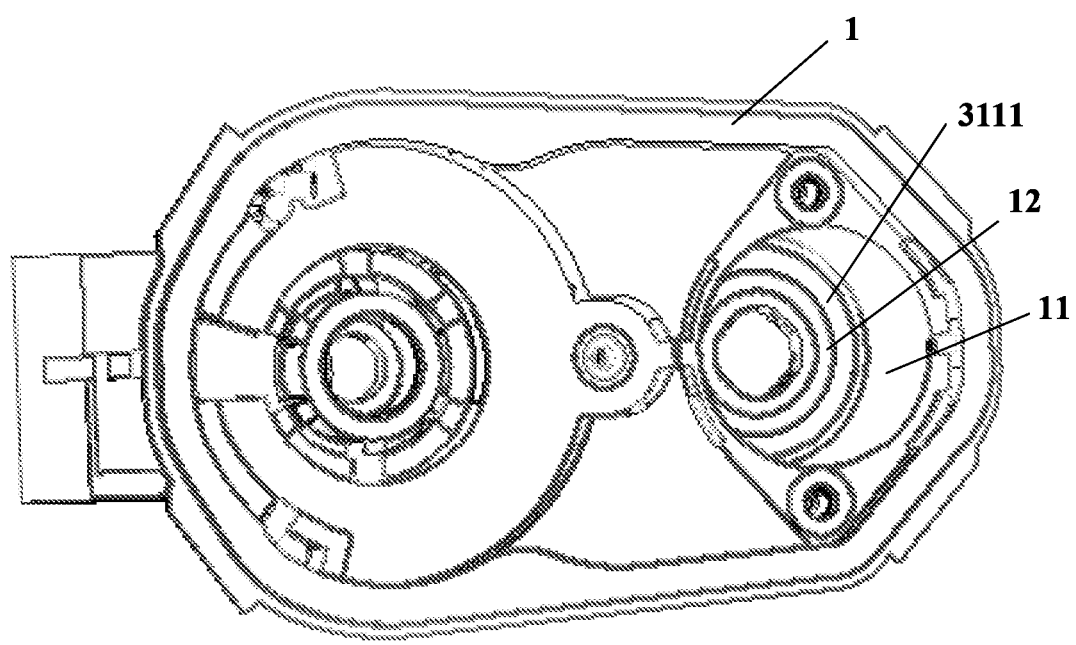
FIG. 4 shows another schematic perspective diagram of the throttle valve housing assembly as shown in FIG. 3.
Figure 5:
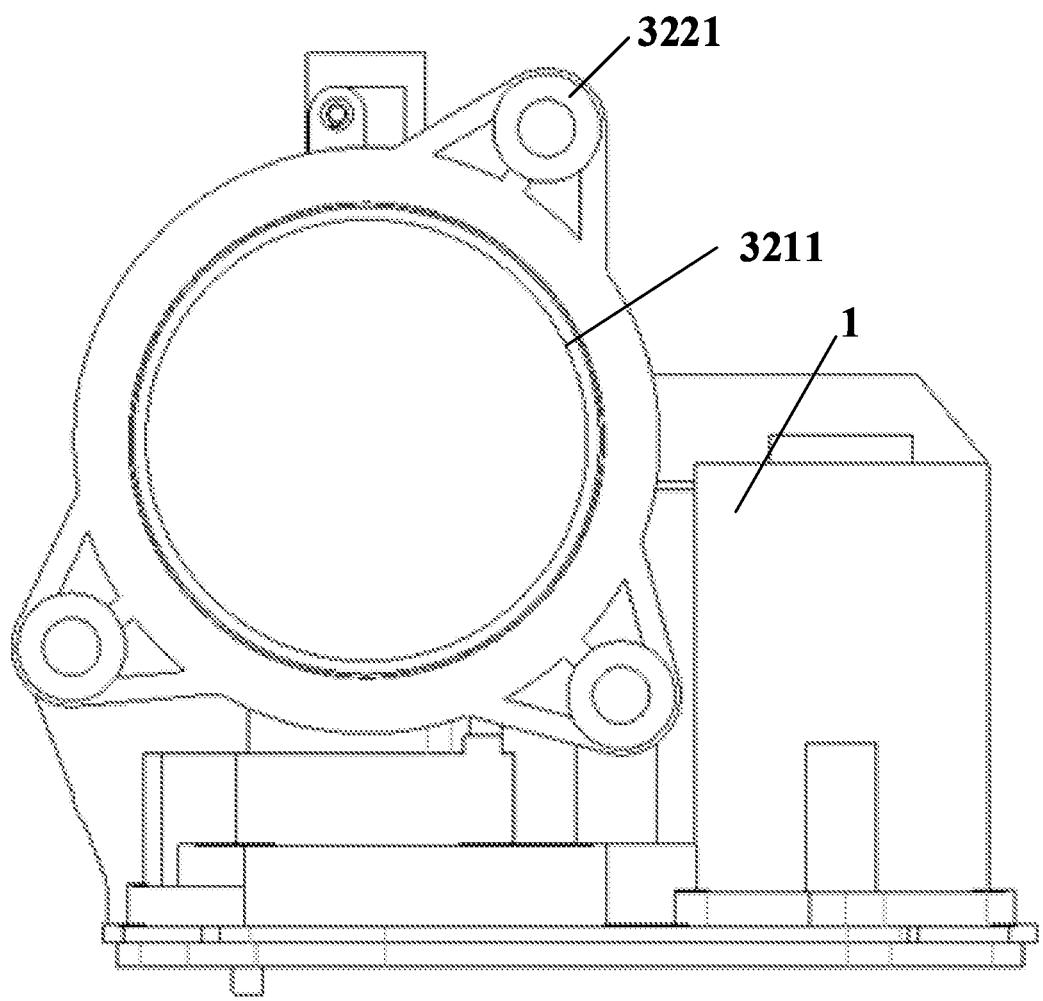
FIG. 5 shows a front view of the throttle valve housing assembly as shown in FIG. 3.
Figure 6:
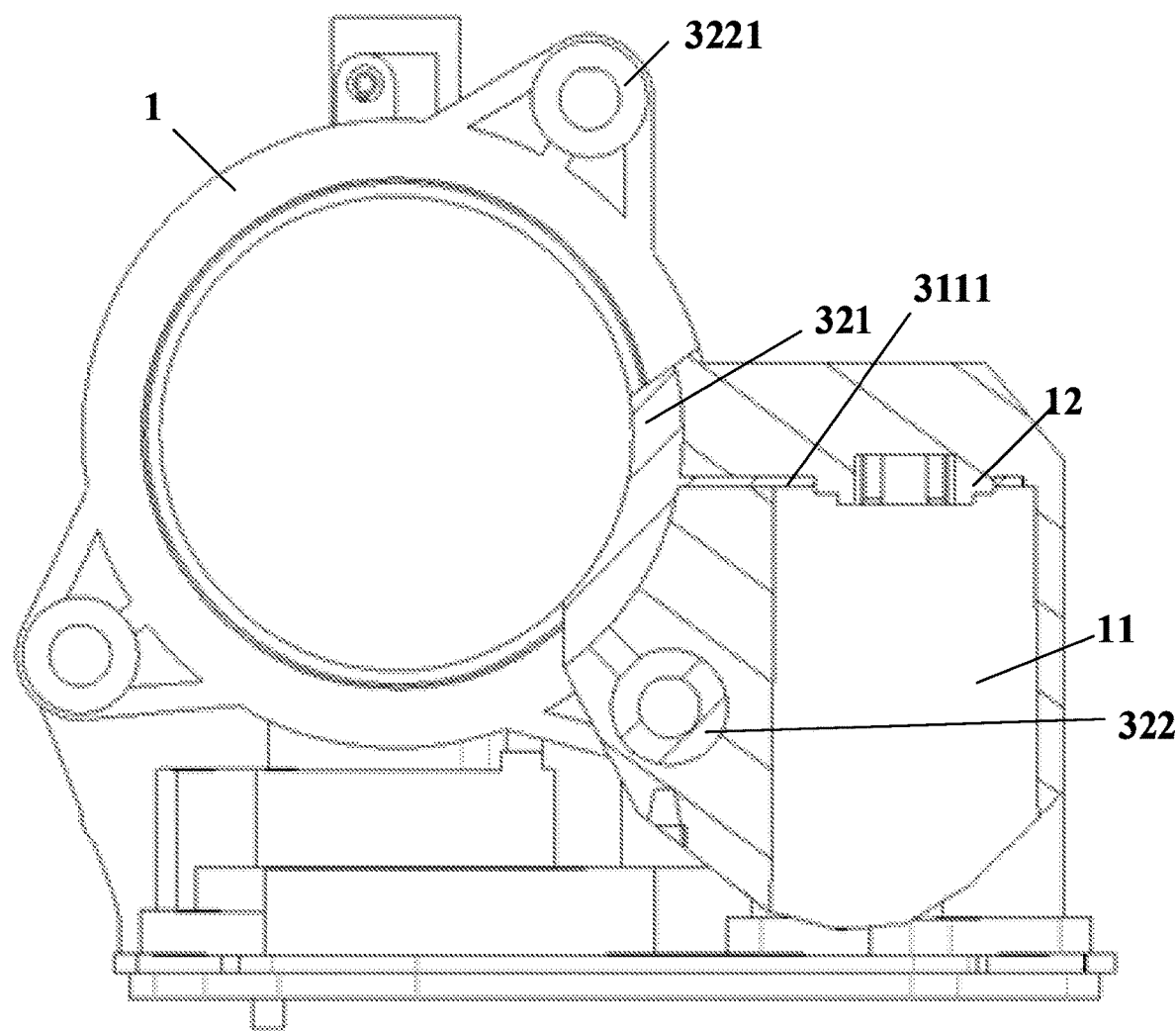
FIG. 6 shows a partial cross-sectional view of the throttle valve housing assembly as shown in FIG. 5.
Figure 7:
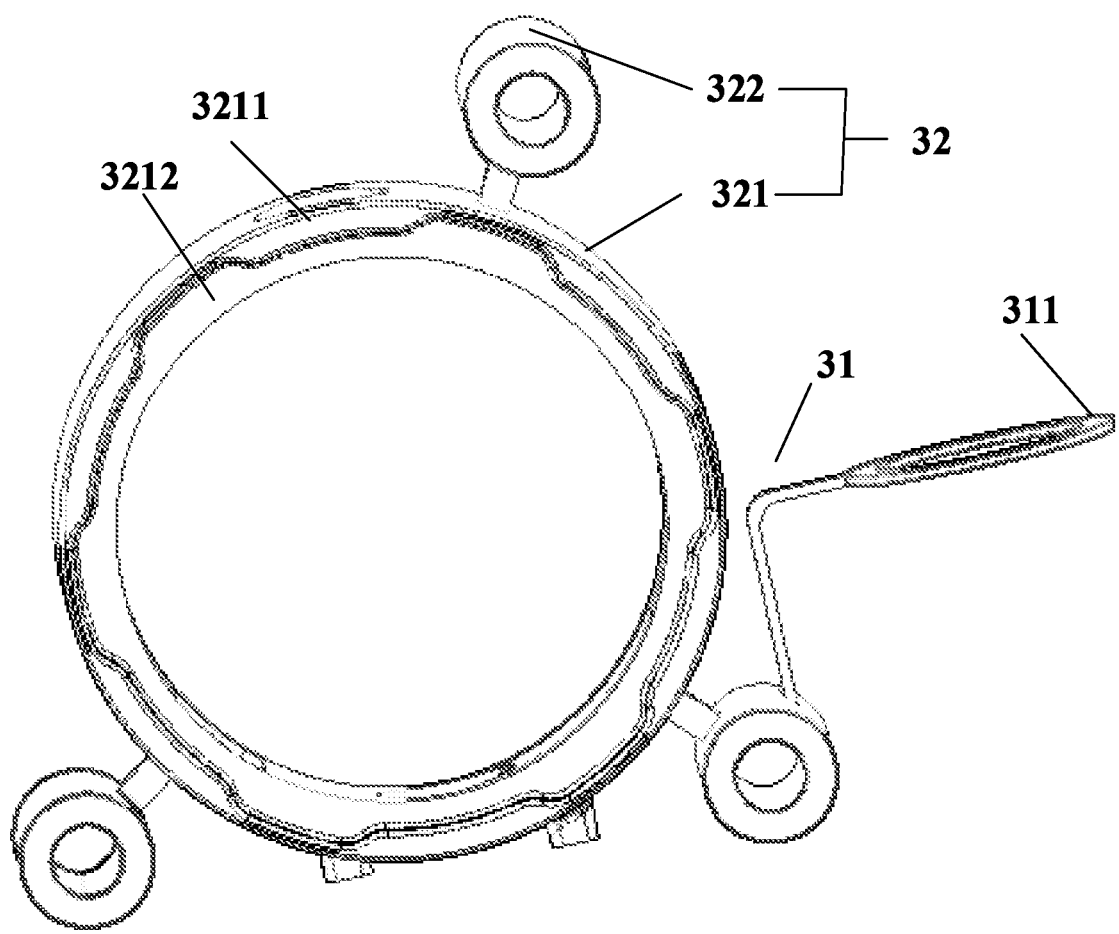
FIG. 7 shows a schematic perspective diagram of an insert according to another exemplary embodiment of the present device.
Figure 8:
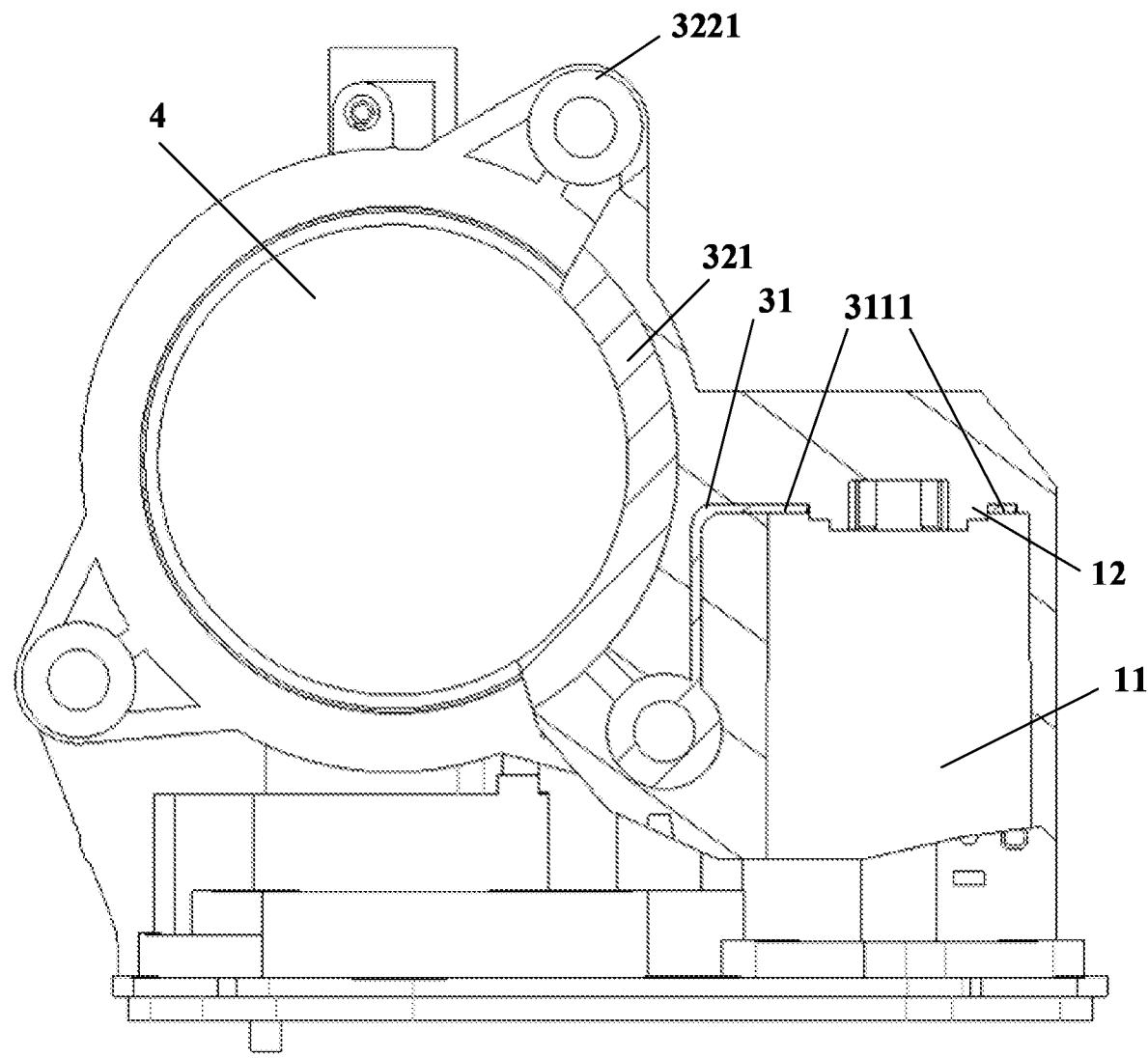
FIG. 8 shows a partial cross-sectional view of a throttle valve housing assembly according to another exemplary embodiment of the present device, with the insert as shown in FIG. 7 over-molded in the throttle valve housing.
Figure 9:
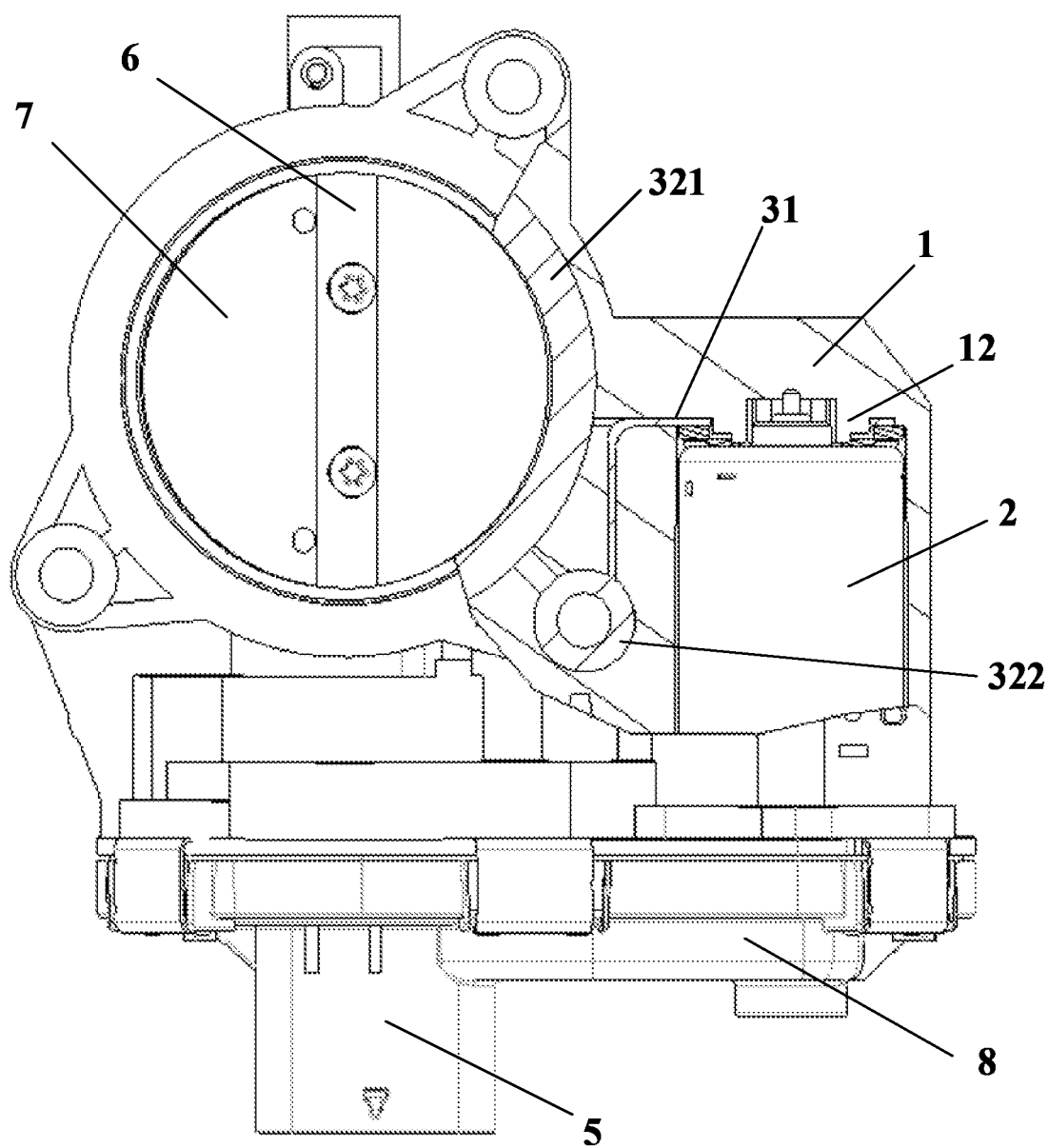
FIG. 9 shows a partial cross-sectional view of a throttle valve after the throttle valve housing assembly as shown in FIG. 8 is assembled.

FIGS. 1 and 2 show an insert as a first embodiment of the present device, and FIG. 7 shows an insert as a second embodiment of the present device. The same reference numerals used in the different embodiments refer to the same components. FIGS. 3 and 4 show a perspective view of the throttle valve housing assembly formed by over-molding an insert 3 in a housing 1, which is applicable to the first embodiment and the second embodiment. FIGS. 5 and 6 show a front view and a partial cross-sectional view of the throttle valve housing assembly formed by over-molding the insert 3 in the housing 1 according to the first embodiment. FIG. 8 shows a partial cross-sectional view of the throttle valve housing assembly formed by over-molding the insert 3 in the housing 1 according to the second embodiment. FIG. 9 shows a partial cross-sectional view of a throttle valve after the throttle valve housing assembly as shown in FIG. 8 is assembled.

As shown in FIGS. 3, 4, 8 and 9, a throttle valve for a vehicle comprises a plastic throttle valve housing 1 and an insert 3 enclosed in the housing 1, with an air flow passage 4 being formed in the housing 1. The throttle valve further comprises an electric motor 2 positioned in an electric motor accommodating chamber 11 located in the housing 1, the electric motor 2 driving a throttle valve shaft 6 via a transmission mechanism, and the throttle valve shaft 6 passing through the air flow passage 4 and supported in the housing 1. The throttle valve further comprises a butterfly valve 7, the butterfly valve 7 being mounted on the throttle valve shaft 6 and disposed in the air flow passage 4 of the throttle valve; and a cover 8 that cooperates with the housing 1. The electric motor 2 drives the throttle valve shaft 6 to rotate via the transmission mechanism, and the butterfly valve 7 is then driven to rotate, thereby implementing the adjustment for the opening of the airflow passage 4 of the throttle valve. The throttle valve further comprises an adapter 5 for electrically connecting the throttle valve to the electronic device of the client. The electronic device is for example an electronic control unit (ECU) of a vehicle, which implements, for example, the control of the opening and closing of the throttle valve.

A first embodiment of the present device will be described below in conjunction with FIGS. 1-7: the insert 3 is adapted to be inserted into the housing 1 of the throttle valve and comprises an electrically conductive insert body 32 and an electrically conductive electric motor connector 31, wherein the insert body 32 is at least partially accessibly exposed from the housing 1, and one end of the electric motor connector 31 is electrically connected to the insert body 32, and the other end thereof is electrically connected to the electrically conductive housing of the electric motor. The throttle valve's insert 3 having this structure can allow the electrostatic discharge gun to directly shoot the accessible insert body exposed from the housing as shown in FIG. 3, for example, an axial end face 3211 of an annular body 321, an axial end face 3221 of a connecting hole insert 322 and an inner annular surface 3213 of the annular body 321. The static electricity reaches the electronic device via the path formed by the insert body, the electric motor connector, the electrically conductive housing of the electric motor, a wire, the adapter 5 of the throttle valve to the electronic device of the client, and the electronic device (not shown), implementing testing for the performance of the electronic device for the resistance to the electrostatic discharge from the throttle valve.

A person skilled in the art would have appreciated that although the electrical connection as shown in FIGS. 1-7 is achieved by the direct contact between the electrically conductive electric motor connector and the electrically conductive housing of the insert body as well as the electric motor, a person skilled in the art would have appreciated that the present device is not limited thereto, and other indirect contact electrical connection methods are also included in the concept of the present device.

By way of example, it is described in this embodiment that the insert body 32 comprises an electrically conductive annular body 321 and at least one electrically conductive connecting hole insert 322, the connecting hole insert 322 is adapted to cooperate with the housing connector (not shown) to secure the housing 1 to the vehicle, wherein an inner surface of the annular body and at least a portion of the axial end surface of the annular body are exposed from the housing, and both axial end faces 3221 of each connecting hole insert 322 are exposed from the housing. With this structure, the connecting hole insert 322 is also enclosed in the housing during the injection molding of the housing 1, omitting the step of respectively fitting the plurality of connecting hole inserts 322 into the housing 1. The connecting hole insert 322 is adapted for inserting the housing connector, such as a bolt, therethrough so as to connect the throttle valve to a corresponding structure, such as an intake manifold, on the engine block. In the embodiments as shown in FIGS. 1-7, the annular body 321 is integrally formed with the at least one electrically conductive connecting hole insert 322. However, a person skilled in the art would also have appreciated that the above method is only a preferred method, and the concept of the present device is not limited thereto, in which the annular body 321 and the at least one connecting hole insert 322 may also not be integrally formed, that is, the two may be or may not be connected to each other.

In the first embodiment, the electric motor connector 31 is shown connected to the annular body 321 as an example. In the embodiment, the electrostatic discharge gun directly shoots the portion, exposed from the housing, of the annular body 321, and the static electricity reaches the electronic device via the path formed by the insert body 321, the electric motor connector 31, the electrically conductive housing of the electric motor, the wire, the adapter 5 of the throttle valve to the electronic device, and the electronic device (not shown), implementing testing for the performance of the electronic device for the resistance to the electrostatic discharge from the throttle valve. On the other hand, in the preferred embodiment in which the electrically conductive annular body 321 is connected to the at least one electrically conductive connecting hole insert 322, the electrostatic discharge gun can also shoot the exposed axial end face of the connecting hole insert 322. After the throttle valve is mounted on the engine, since the electrically conductive electric motor housing is electrically connected to the connecting hole insert 322 by the electric motor connector 31 and the annular body 321 and is further connected to the engine block by a preferably electrically conductive housing connector, such as a metal bolt, it is possible to implement the grounding of the electrically conductive electric motor housing (also referred to as connecting to the vehicle ground), so that the filter capacitor connected to the electrically conductive electric motor housing can function to remove the electromagnetic interference generated in the electric motor.

Preferably, the electric motor connector 31 is integrally formed with the annular body 321 and the at least one connecting hole insert 322. With this structure, the three are electrically connected to each other, so that the electrostatic discharge gun can either shoot the annular body 321 or shoot the connecting hole insert 322 while the insert 3 is integrally formed in a simple and easy manner, so that it is possible to implement testing for the performance of the electronic device for the resistance to the electrostatic discharge from the throttle valve, and at the same time remove the electromagnetic interference by the filter capacitor after the throttle valve is mounted to the vehicle. In addition, compared to a conventional solution in which a plurality of metal connecting hole inserts 322 are respectively pressed into the holes for connectors that have been formed in the plastic housing 1, it is possible to omit the assembly step of pressing the connecting hole inserts 322 into the housing 1 and improve the accuracy of products as well, while reduce the number of parts and reduce the manufacturing costs.

As an example, as shown in FIGS. 1, 4 and 6, the electric motor connector 31 comprises an annular part 311, and at least a portion 3111 of the annular part 311 extends into the electric motor accommodating chamber 11 formed in the housing 1 to come into contact with the electrically conductive housing of the electric motor 2. As shown in FIG. 6, a central hole of the annular part 311 is adapted to receive the material of the housing 1 during the injection molding of the housing 1 in order to position the electric motor connector 31 in the housing 1. As shown in FIG. 6, it can also be understood that a boss 12 is formed during the injection molding of the housing, and the annular part 311 is inserted in the boss through the central hole thereof, thereby implementing the positioning of the annular part 311.

As an example, the insert 3 is made of a metal or an alloy material thereof, such as an aluminum alloy and a copper alloy, which is less deformable and has a higher rigidity than plastics under high temperature conditions. As an example, the insert 3 formed as an integral piece can be easily formed by die casting, stamping or other processes.

The housing connector may be a bolt, a screw or the like, and is inserted into the connecting hole insert 322 to connect the throttle valve to the engine block of the vehicle. However, a person skilled in the art would have appreciated that connectors of other structures are also suitable.

As an example, the material of the throttle valve housing 1 may be plastic, preferably high temperature resistant plastic, for example, PPA, PPS, and other materials, such that the throttle valve housing 1 can be formed by injection molding. During the injection molding of the housing 1, the formed insert 3, preferably as an integral piece, is positioned at a specific position in the mold, and injection molding is carried out with the material for forming the housing 1, so that the material of the housing 1 at least partially encloses the insert 3, thereby fixedly bonding the insert 3 and the housing 1 to each other, the resulting component being shown in FIGS. 3-6. Specifically, an outer peripheral surface of the annular body 321, at least a portion of the axial end face 3211 of the annular body 321, and an outer peripheral surface of the connecting hole insert 322 are all bonded to the plastic material of the housing 1 and the electric motor connector 31 is inserted into the material of the housing. The electric motor connector 31 comprises the annular part 311, and at least a portion 3111 of the annular part 311 extends into the electric motor accommodating chamber 11 formed in the housing 1 to come into contact with the electrically conductive housing of the electric motor 2. The electric motor connector 31 is not exposed from the housing and is inaccessible after the assembly of the throttle valve is completed.

During the injection molding of the housing 1 that encloses the insert 3, in order to firmly bond the insert 3 in the housing 1, as shown in FIGS. 1-2, a recess 3212 is formed in at least one of the axial end faces 3211 of the annular body 321, and the recess 3212 is adapted to receive the material of the housing 1 during the injection molding of the housing 1 to firmly bond the insert 4 in the housing 1. As an example, the recess 3212 is formed in one of the axial end faces 3211 of the annular body 321, or the recess 3212 is formed in each of the two axial end faces 3211.

FIGS. 3, 4 and 7-9 show a second embodiment of the throttle valve according to the present device, and the second embodiment is different from the first embodiment in that the electric motor connector 31 is connected to the connecting hole insert 322. In this embodiment, since the electrically conductive housing of the electric motor 2 is electrically connected to the connecting hole insert 322 by the electric motor connector 31 and in turn is connected to an engine housing by a preferably electrically conductive housing connector such as a metal bolt (not shown), it is possible to implement the grounding of the electrically conductive housing of the electric motor 2, so that the filter capacitor removes the electromagnetic interference. Further, a person skilled in the art would have appreciated that although in this embodiment it is preferable that the electric motor connector 31, the connecting hole insert 322 and the annular body 321 are integrally formed, the electrostatic discharge gun can either shoot the axial end faces 3211 of the annular body 321 or shoot the connecting hole insert 322 to carry out the antistatic performance test. However, the connecting hole insert 322 may also not be connected to the annular body 321 and is only connected to the electric motor connector 31, so that the electrostatic discharge gun directly shoots the axial end faces, exposed from the housing, of the connecting hole insert 322, and the static electricity reaches the electronic device via the path formed by the insert body 322, the electric motor connector 31, the electrically conductive electric motor housing, the wire, the adapter 5 of the throttle valve to the electronic device, and the electronic device (not shown), implementing testing for the performance of the electronic device for the resistance to the electrostatic discharge from the throttle valve. Depending on different desired performances, a person skilled in the art would have combined the connection methods between the annular body 321, the connecting hole insert 32 and the electric motor connector 31 as needed.

The present device further relates to a vehicle comprising the throttle valve of the above various structures, and the vehicle thus has the advantages of the throttle valve of the above structures.

Although some embodiments of the general concept of the present device have been shown and described, those skilled in the art would have appreciated that changes could be made to these embodiments without departing from the principle and spirit of the general concept of the present device and the scope of the present device is defined by the claims and their equivalents.

It should be noted that the wording "comprise" does not exclude other elements or steps, and the wording "a" or "an" does not exclude more than one. In addition, any element sign in the claims should not be construed as limiting the scope of the present device.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A throttle valve for a vehicle, comprising:
a housing (1);
an electric motor (2), the electric motor (2) being accommodated in the housing and configured to drive an opening and closing of an air flow passage of the throttle valve; and
an insert (3) arranged so as to be partially enclosed in the housing (1), the insert (3) comprising:
an electrically conductive insert body (32) arranged so as to be at least partially accessibly exposed from the housing (1), and
an electrically conductive electric motor connector (31), the electric motor connector (31) being enclosed in the housing (1), with a first end of the electric motor connector (31) being electrically connected to the insert body (32) and a second end of the electric motor connector (31) being electrically connected to the electrically conductive housing of the electric motor,
wherein the insert body (32) comprises an electrically conductive annular body (321), at least a portion of an axial end face (3211) of the annular body and an inner surface (3213) of the annular body being exposed from the housing (1),
wherein the insert body (32) further comprises at least one electrically conductive connecting hole insert (322), the at least one electrically conductive connecting hole insert (322) being configured to, using a housing connector, secure the housing (1) to the vehicle,
wherein axial end faces of each of the connecting hole inserts (322) are exposed from the housing, and
wherein the electric motor connector (31) is integrally formed with the annular body (321) and the at least one connecting hole insert (322), the annular body (321) and the at least one connecting hole insert (322) being connected to one another, the electric motor connector (31) being an L-shaped projection, a first leg of the L-shaped projection being parallel to a longitudinal axis of the electric motor (2) and extending from the at least one connecting hole insert (322) and a second leg of the L-shaped projection being perpendicular to the longitudinal axis of the electric motor (2).

2. The throttle valve for a vehicle as claimed in claim 1, wherein the housing connector is an electrically conductive connector.

3. The throttle valve for a vehicle as claimed in claim 1, wherein at least a portion of the second leg of the L-shaped projection that terminates in an annular part (311) extends into an electric motor accommodating chamber (11) formed in the housing (1) so as to come into contact with the electrically conductive housing of the electric motor (2).

4. The throttle valve for a vehicle as claimed in claim 3, wherein a central hole of the annular part (311) is configured to receive the material of the housing (1) during injection molding of the housing (1) to position the electric motor connector (31) in the housing (1).

5. The throttle valve for a vehicle as claimed in claim 1, wherein a recess (3212) is formed in at least one of the axial end faces (3211) of the annular body (321), and the recess (3212) is configured to receive the material of the housing (1) during injection molding of the housing (1) to bond the insert (3) in the housing (1).

6. A vehicle comprising the throttle valve of claim 1.

* * * * *